United States Patent [19]

Hira

[11] 4,453,760
[45] Jun. 12, 1984

[54] COMBINATION RACK-AND-ARMREST ASSEMBLY

[75] Inventor: Kazumi Hira, Fujisawa, Japan

[73] Assignee: Nissan Motor Company, Limited, Yokohama, Japan

[21] Appl. No.: 292,928

[22] Filed: Aug. 14, 1981

[30] Foreign Application Priority Data

Sep. 12, 1980 [JP] Japan .......................... 55-129112[U]

[51] Int. Cl.³ .............................................. B60R 7/04
[52] U.S. Cl. .................................... 296/37.13; 296/153
[58] Field of Search ................... 296/37.13, 37.8, 37.1, 296/37.9, 153; 224/42.43; 248/118; 297/411, 412, 417; 16/DIG. 13, 295, 76; 220/335; 105/325

[56] References Cited

U.S. PATENT DOCUMENTS

| | | | |
|---|---|---|---|
| 2,557,048 | 6/1951 | Haase | 220/335 |
| 3,923,196 | 12/1975 | Miller | 220/335 |
| 4,135,759 | 1/1979 | Bott et al. | 296/153 |
| 4,158,902 | 6/1979 | Chernack et al. | 220/335 |
| 4,165,898 | 8/1979 | Janz et al. | 296/153 |

FOREIGN PATENT DOCUMENTS 2380913 10/1978 France .......................... 296/37.13
1037050 7/1966 United Kingdom .

Primary Examiner—Robert B. Reeves
Assistant Examiner—Dennis H. Pedder
Attorney, Agent, or Firm—Lane, Aitken & Kananen

[57] ABSTRACT

A combination rack-and-armrest assembly for attachment to the inner panel of a door structure of an automotive vehicle body, comprising an upwardly open, hollow receptacle secured to the inner panel of the door structure and an armrest member at least in part pivotally movable with respect to the receptacle about a horizontal axis adjacent the inner panel of the door structure between a horizontal position closing the upper end of the receptacle and an upwardly inclined position allowing the receptacle to be open upwardly through the upper end of the receptacle, the receptacle and the armrest member being formed with a concavity and a recess, respectively, along the inner panel of the door structure for permitting a vehicle occupant to pull the door structure from an open position with his fingers slipped into the concavity.

6 Claims, 9 Drawing Figures

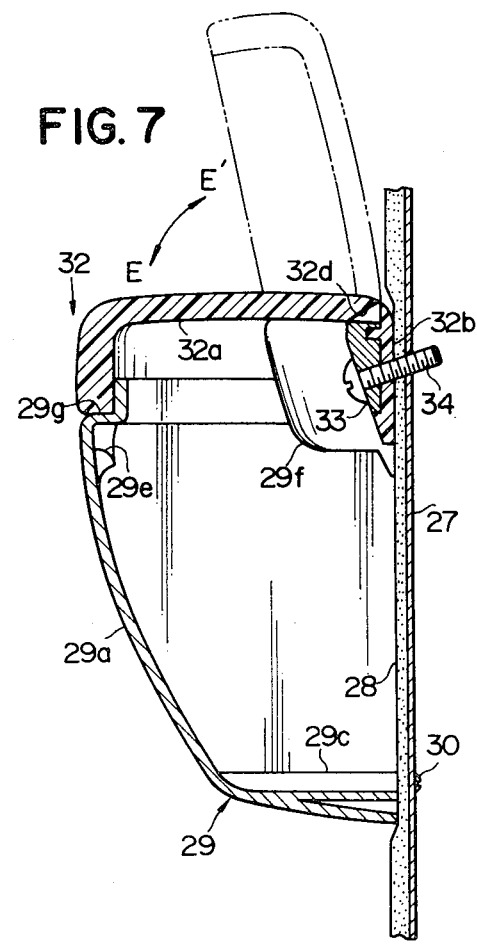
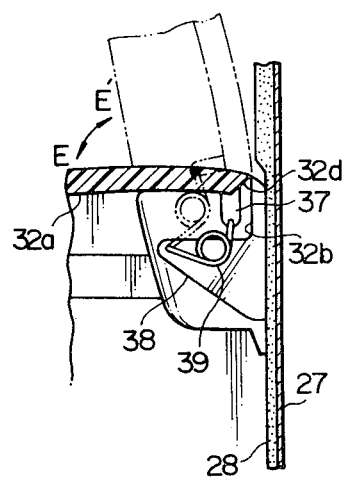

COMBINATION RACK-AND-ARMREST ASSEMBLY

FIELD OF THE INVENTION

The present invention relates to a combination rack-and-armrest assembly for use as an attachment to a door structure of an automotive vehicle. The combination rack-and-armrest assembly is operable as a rack for storing an article such as a road map therein and as an armrest for a vehicle occupant seated aside the door structure to which the rack-and-armrest assembly is attached. The combination rack-and-armrest assembly is further operable as a door handle for closing the door structure from the inside of the vehicle.

SUMMARY OF THE INVENTION

In accordance with the present invention, there is provided a combination rack-and-armrest assembly for attachment to an inner panel of a door structure of an automotive vehicle body, comprising a hollow receptacle secured to the inner panel of the door structure and having an open upper end, the hollow receptacle having an inner wall portion spaced apart inwardly from the inner panel of the door structure and a grip portion formed with an upwardly open concavity adjacent the inner panel of the door structure, the concavity having a width which will allow passage of fingers of an ordinary person thereinto, and an armrest member at least in part pivotally movable with respect to the receptacle about a substantially horizontal axis adjacent the inner panel of the door structure between a first angular position closing the upper end of the receptacle and a second angular position angularly displaced upwardly from the first angular position and allowing the receptacle to be open upwardly through the upper end thereof, the armrest member being formed with a recess forming a gap above said concavity in the grip portion of the receptacle. Preferably, the armrest member has a lid portion pivotally movable about the aforesaid axis between the first angular position and the second angular position and a retaining portion secured to the inner panel of the door structure and is formed with two grooves which are aligned with each other across the above mentioned recess and which extend along said axis, the lid portion being pivotally movable with respect to the retaining portion across the above mentioned grooves.

BRIEF DESCRIPTION OF THE DRAWINGS

Drawbacks of prior-art combination rack-and-armrest assemblies and detailed features and advantages of a combination rack-and-armrest assembly according to the present invention will be understood from the following description taken in conjunction with the accompanying drawings in which:

FIG. 7 is a vertical sectional view taken, also to an enlarged scale, along lines VII—VII in FIG. 5; and FIG. 8 is a fragmentary vertical sectional view taken, also to an enlarged scale, along lines VIII—VIII in FIG. 5.

DESCRIPTION OF THE PRIOR ART

Figure 1:
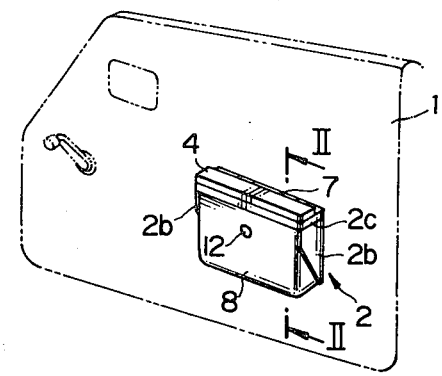
FIG. 1 is a perspective view showing an example of a known combination rack-and-armrest assembly of the nature to which the present invention appertains.
Figure 2:
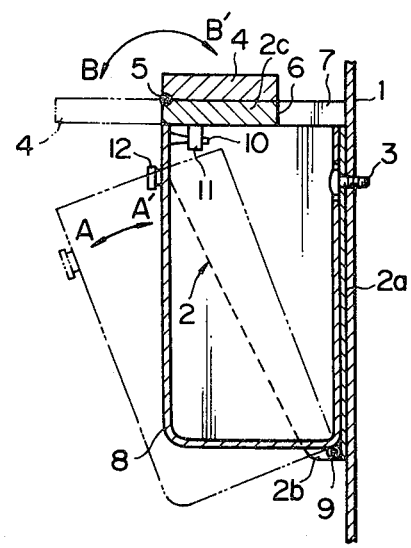
FIG. 2 is a vertical sectional view taken, to an enlarged scale, along lines II—II in FIG. 1.

In FIGS. 1 and 2 of the drawings, a prior-art combination rack-and-armrest assembly is shown mounted on an inner panel 1 of a door structure of a vehicle body. The combination rack-arm-armrest assembly comprises a bracket member 2 having a base wall portion 2a and a pair of side wall portions 2b. The base wall portion 2a is securely attached to the inner panel 1 of the door structure by means of screws 3. The side wall portions 2b are bent from the base wall portion 2a and project perpendicularly away from the inner panel 1 into the vehicle compartment (not shown). The bracket member 2 further has an upper wall portion 2c to which a shelf member 4 is hingedly connected by hinge pins 5. The upper wall portion 2c of the bracket member 2 is formed with an elongated recess 6, forming a gap 7 between the inner panel 1 and the wall portion 2c of the bracket member 2. The width of the gap 7 is such that will allow passage of fingers of an ordinary person therethrough.

The rack-and-armrest assembly shown in FIGS. 1 and 2 further comprises a generally box-shaped hollow receptacle 8 having an open upper end. The receptacle 8 is hingedly connected to the base wall portion 2a of the bracket member 2 by means of hinge pins 9 located adjacent the lower end of the base wall portion 2a and the lower end of an outer or panel-side wall portion of the receptacle 8. Each of the screws 3 securing the base wall portion 2a of the bracket member 2 to the inner panel 1 of the door structure has a head portion located in an aperture formed in the panel-side wall portion of the receptacle 8 as shown.

The hollow receptacle 8 is pivotally movable about the hinge pins 9 in opposite directions indicated by arrowheads A and A' between an upright position indicated by full lines and an inclined position indicated by dots-and-dash lines in FIG. 2. When the receptacle 8 is held in the upright position, the receptacle 8 has its upper end partly closed by the upper wall portion 2c of the bracket member 2 and partly open upwardly through the gap 7 formed by the recess 6 in the wall portion 2c. The receptacle 8 is retained in the upright position by the engagement between a hook 10 connected to the receptacle 8 and a retainer element 11 connected to the bracket member 2 as shown in FIG. 2. Any article such as a road map (not shown) may be stored in the receptacle 8 which is thus held in the upright position thereof.

The receptacle 8 has a knob 12 mounted on the outer face of an inner wall portion thereof and can thus be easily pulled out from the upright position to the inclined position about the hinge pins 9 as indicated by the arrowhead A in FIG. 2. When turned into the inclined position thereof, the receptacle 8 has its upper end almost fully open upwardly and provides access to the interior thereof through the open upper end, permitting a vehicle occupant to take out the article such as the road map from the interior of the receptacle 8.

On the other hand, the shelf member 4 is pivotally movable about the hinge pins 5 in opposite directions indicated by B and B' between a first horizontal position resting on the upper wall portion 2c of the bracket member 2 as indicated by full-lines and a second horizontal position turned upside down on the inner side of the wall portion 2c as indicated by dots-and-dash lines in FIG. 2. In this instance, the shelf member 4 and the upper wall portion 2c of the bracket member 2 have their respective upper faces flush with each other and constitute, in combination, a table which can be utilized as an armrest for a vehicle occupant seated aside the shown door structure.

The combination rack-and-armrest assembly shown in FIGS. 1 and 2 can be further utilized as a handle for closing the door from an open position by gripping the upper wall portion 2c of the bracket member 2 by fingers through the gap 7 and pulling the door structure toward the vehicle compartment.

The prior-art combination rack-and-armrest assembly of the nature hereinbefore described has drawbacks one of which is that the vehicle occupant seated aside the assembly is compelled to move himself or twist his waist on the seat away from the assembly each time the vehicle occupant wishes to put an article into or take out the article from the receptacle 8 by moving the receptacle 8 to the inclined position thereof. Another drawback is that the receptacle 8 happens to be unnecessarily flung into the inclined position by an impact caused when the door structure is closed violently. To avoid this inconvenience, the hook 10 and the retainer element 11 must be designed to have disproportionately robust constructions.

Figure 3:
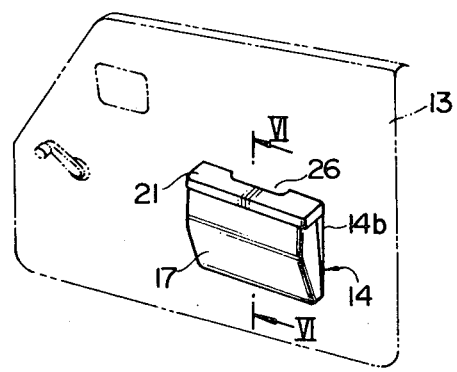
FIG. 3 is a perspective view showing another example of a known combination rack-and-armrest assembly of the nature to which the present invention appertains.
Figure 4:
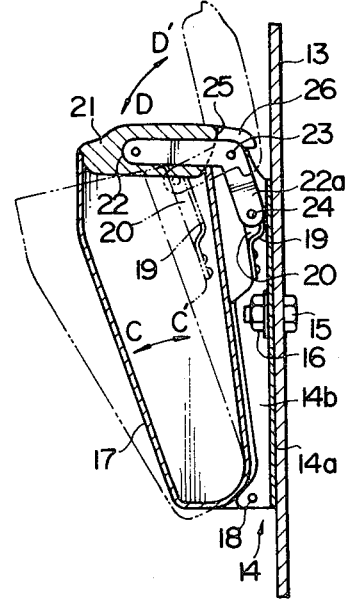
FIG. 4 is a vertical sectional view taken, to an enlarged scale, along lines IV—IV in FIG. 3.
Figure 5:
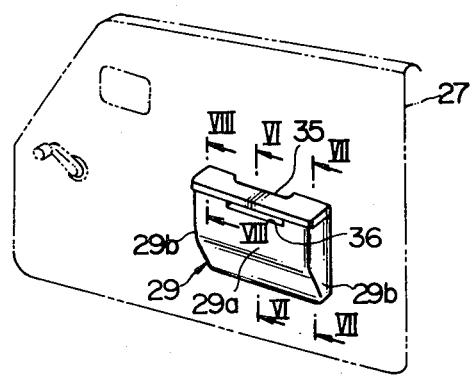
FIG. 5 is a perspective view showing an embodiment of a combination rack-and-armrest assembly according to the present invention.

FIGS. 3 and 4 of the drawings shown another prior-art combination rack-and-armrest assembly. The combination rack-and-armrest assembly is mounted on an inner panel 13 of a door structure of a vehicle body and comprises a bracket member 14 having a base wall portion 14a and a pair of side wall portions 14b only one of which is seen in FIGS. 3 and 4. The base wall portion 14a is securely attached to the inner panel 13 of the door structure by means of bolts 15 and nuts 16. The side wall portions 14b are bent from the base wall portion 14a and project perpendicularly away from the inner panel 13 of the door structure. A generally box-shaped hollow receptacle 17 having an open upper end is hingedly connected to the side wall portions 14b of the bracket member 14 by means of hinge pins 18 located adjacent the lower end of an outer or panel-side wall portion of the receptacle 17. The receptacle 17 has securely attached to the outer face of its panel-side wall portion a guide plate 19 which is partly spaced apart outwardly from the outer face of the panel-side wall portion of the receptacle 17 so as to form a gap 20 between the guide plate 19 and the panel-side wall portion of the receptacle 17.

An armrest member 21 having an arm member 22 securely attached to the former is hingedly connected to the side wall portions 14b of the bracket member 14 by means of hinge pins 23. The arm member 22 is in the form of a bell-crank lever and has an arm portion 22a carrying a slider pin 24 axially extending through the gap 20 between the guide plate 19 and the panel-side wall portion of the receptacle 17. The armrest member 21 has an elongated recess 25 forming a gap 26 between the armrest member 22 and the inner panel 13 of the door structure.

The receptacle 17 is pivotally movable about the hinge pins 18 in opposite directions indicated by arrowheads C and C' between an upright position close to the inner panel 13 as indicated by full lines and an inclined position remote from the inner panel 13 as indicated by dots-and-dash lines in FIG. 4. On the other hand, the armrest member 21 is pivotally movable about the hinge pins 23 in opposite directions indicated by arrowheads D and D' between a horizontal position indicated by full lines and an upwardly inclined position indicated by dots-and-dash lines in FIG. 4. When the receptacle 17 is held in the upright position with the armrest member 21 held in the horizontal position thereof, the receptacle 17 has its upper end partly closed by the armrest member 21 and partly open through the gap 26. Any article such as a road map (not shown) may be stored in the receptacle 17 which is thus held in the upright position with the armrest member 21 held in the horizontal position closing the upper end of the receptacle 17. The armrest member 21 held in the horizontal position may be used as an armrest for a vehicle occupant seated aside the shown door structure.

When the armrest member 21 is manually turned in the direction of the arrowhead D' from the horizontal position to the upwardly inclined position thereof, the slider pin 24 is caused to upwardly slide on the outer face of the panel-side wall portion of the receptacle 17. This causes the receptacle 17 to pivotally move about the hinge pins 18 in the direction of the arrowhead C from the upright position toward the inclined position thereof. When the receptacle 17 is thus moved into the inclined position thereof, the receptacle 17 is made fully open at the upper end thereof and provides access to the interior of the receptacle, permitting a vehicle occupant to take out the article stored in the receptacle. When the armrest member 21 is turned in the direction of the arrowhead D from the upwardly inclined position toward the horizontal position thereof, the slider pin 24 is caused to downwardly slide on the inner face of the guide plate 19 and causes the receptacle 17 to pivotally move in the direction of the arrowhead C' from the inclined position to the upright position thereof.

The combination rack-and-armrest assembly shown in FIGS. 3 and 4 can further be utilized as a handle for closing the door structure from an open position by gripping the armrest member 21 by fingers through the gap 26 and pulling the armrest member 21 toward the vehicle compartment.

The prior-art rack-and-armrest assembly of the type hereinbefore described with reference to FIGS. 3 and 4 has drawbacks one of which is that the hinge pins 23 providing the pivotal connection between the bracket member 14 and the armrest member 21 are subjected to load each time the door structure is closed by pulling the armrest member 21. Repeated application of loads to the hinge pins 23 may cause loosening of the mechanical connection between the bracket member 14 and the armrest member 21. Another drawback is that the vehicle occupant seated aside the rack-and-armrest assembly is compelled to move himself or twist his waist on the seat away from the assembly each time the occupant wishes to put an article into or take out the article from the receptacle 17 by moving the receptacle 17 to the inclined position thereof.

The present invention contemplates elimination of the drawbacks involved in prior-art combination rackand-armrest assemblies of the types hereinbefore described with reference to FIGS. 1 and 2 and FIGS. 3 and 4 of the drawings.

DESCRIPTION OF THE EMBODIMENT

Referring to FIGS. 5 to 8 of the drawings, a combination rack-and-armrest assembly embodying the present invention is mounted on an inner panel 27 of a door structure of a vehicle body having an inner lining 28 attached to the inner face of the inner panel 27. The combination rack-and-armrest assembly comprises a receptacle 29 having an inner wall portion 29a spaced apart from the inner lining 28 and a pair of side wall portions 29b bent from the inner wall portion 29a perpendicularly to the inner panel 27 as will be best seen from FIG. 5. The receptacle 29 further has a reinforcement portion 29c formed with a plurality of internally threaded holes 29d axially extending perpendicularly to the inner panel 27. The receptacle 29 is securely attached to the inner panel 27 by screws 30 each screwed into each of the internally threaded holes 29d through each of apertures formed in the inner panel 27 and the lining 28. The inner wall portion 29a of the receptacle 29 is formed with a recess 29e horizontally extending along the upper end of the inner wall portion 29a substantially in parallel with the inner panel 27.

The receptacle 29 further has a grip portion 29f having an end face firmly attached to the lining 28. The grip portion 29f is partially bent or curved upwardly and spaced apart from the lining 28 so that a generally trough-shaped concavity 31 is formed between the lining 28 and the outer surface of the grip portion 29f as will be best seen from FIG. 6. The grip portion 29f longitudinally extends intermediate between the side wall portions 29b of the receptacle 29 as will be understood from the illustrations of FIGS. 5 to 7. Furthermore, the grip portion 29f is laterally spaced apart from the upper end of the inner wall portion 29a of the receptacle 29 and forms between the inner wall portion 29a and the grip portion 29f an open upper end extending substantially in parallel with the inner panel 27.

Figure 6:
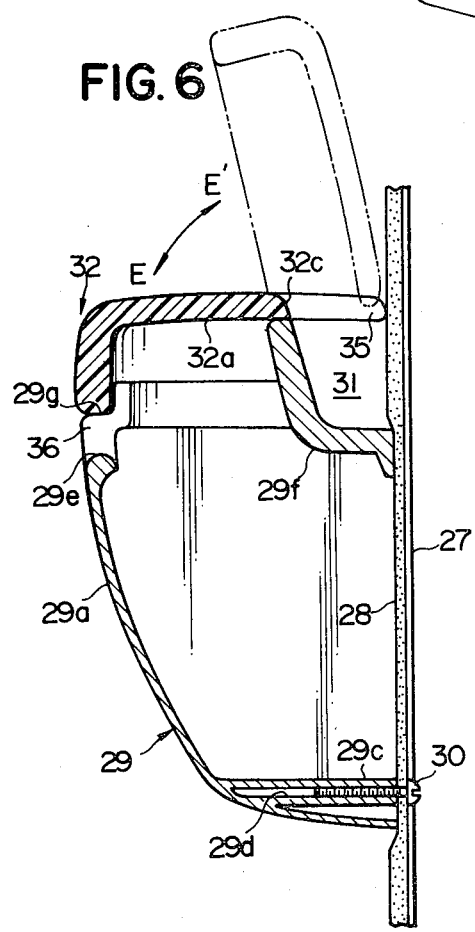
FIG. 6 is a vertical sectional view taken, to an enlarged scale, along lines VI—VI in FIG. 5.

The combination rack-and-armrest assembly embodying the present invention further comprises an armrest member 32 having a lid portion 32a and a retaining portion 32b. The retaining portion 32b is secured to the inner panel 27 of the door structure across the lining 28 by suitable fastening means. In FIG. 7 of the drawings, the fastening means is shown including a retainer strip 33 fitted to the lining 28 and screws 34 fastening the retainer strip 33 and the retaining portion 32b of the armrest member 32 to the inner panel 27 across the lining 28. The lid portion 32a is formed with a recess 32c horizontally elongated along the inner panel 27 of the door structure and located above the trough-shaped concavity 31 in the grip portion 29f of the receptacle 29 as shown in FIG. 6.

Figure 9:
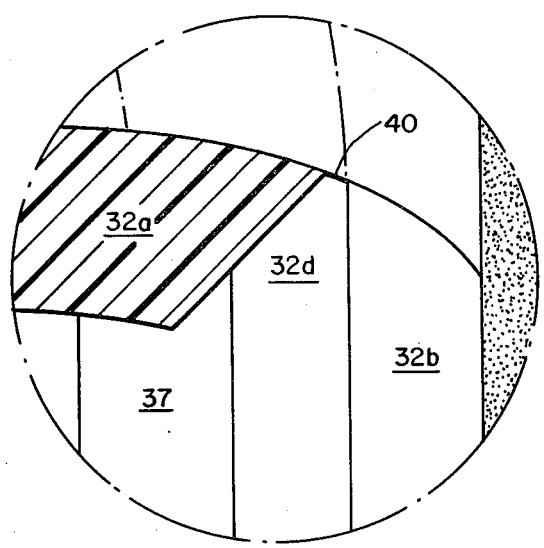
FIG. 9 is an enlargement of groove 32d of FIG. 8.

The armrest member 32 is constructed of a synthetic resin and is formed with two grooves 32d which extend longitudinally in line with each other across the recess 32c and across which the above mentioned lid portion 32a is pivotally movable with respect to the retaining portion 32b of the armrest member 32 as indicated by arrowheads E and E' in FIG. 7. By reason of the hinge effect resulting from the formation of the grooves 32d, the lid portion 32a of the armrest member 32 is pivotally movable about a substantially horizontal axis along the grooves 32d in opposite directions indicated by arrowheads E and E' between a horizontal position closing the upper end of the receptacle 29 as indicated by full lines and an upwardly inclined position angularly raised above the horizontal position and allowing the receptacle 29 to be open at the upper end thereof as indicated by dots-and-dash lines in FIGS. 6 and 7. The hinge effect of grooves 32d is depicted in FIG. 9, which is an enlargement of grooves 32d that appear in FIG. 8, wherein hinge 40 is identified. The lid portion 32a of the armrest member 32 is, thus, hingedly connected to the inner panel 27 of the door structure by means of the grooves 32d formed in the armrest member 32. When the lid portion 32a is held in the horizontal position thereof, the recess 32c in the lid portion 32a forms a gap 35 between the lid portion 32a and the lining 28 and above the trough-shaped concavity 31 in the grip portion 29f of the receptacle 29. The width of the recess 32c and accordingly of the gap 35 is such that will allow passage of the fingers of an ordinary person therethrough. If desired, the lid portion 32a may be constituted by an independent lid member hingedly connected to the inner panel 27 by suitable hinge or pivot means of another form, though not shown in the drawings.

The lid portion 32a of the armrest member 32 partially projects downwardly along its laterally inner end and, when the lid portion 32a is held in the above mentioned horizontal position thereof, rests on the upper edge of the inner wall portion 29a of the receptacle 29. When the lid portion 32a of the armrest member 32 is held in the horizontal position thereof, there is a gap 36 formed between the lid portion 32a and the upper end of the inner wall portion 29a of the receptacle 29 which is formed with the recess 29e in the wall portion 29a as illustrated in FIG. 6. The upper edge of the inner wall portion 29a of the receptacle 29 has edge portions 29g longitudinally extending in line with each other across the recess 29e so as to snugly receive thereon the lid portion 32a of the armrest member 32 along the laterally inner end of the lid portion 32a.

The combination rack-and-armrest assembly embodying the present invention further comprises spring means comprising a pair of anchor elements 37 projecting downwardly from the lid portion 32a of the armrest member 32 toward the interior of the receptacle 29 and located adjacent the grooves 32d in the neighborhood of the longitudinally outer ends, respectively, of the lid portion 32a. The spring means further comprises a pair of anchor members 38 secured to the side edges of the retaining portion 32b of the armrest member 32 and located adjacent the anchor elements 37, respectively, and a pair of coiled torsion springs 39 each pivotally connected at one end thereof to each of the anchor elements 37 and at the other end thereof to each of the anchor members 38. The anchor members 38 project perpendicularly from the lining 28 of the inner panel 27 of the door structure into the interior of the armrest member 32, as shown. The anchor elements 37, anchor members 38 and springs 39 are arranged so that each of the springs 39 is effective to urge the lid portion 32a of the armrest member 32 to turn toward the horizontal position thereof about the grooves 32d except when the lid portion 32a is held in the upwardly inclined position thereof. Thus, each of the springs 39 is subjected to an increasing load urging the spring to wind up as the lid portion 32a of the armrest member 32 is turned from the upwardly inclined position toward the horizontal position thereof. As the lid portion 32a of the armrest member 32 is turned from the horizontal position toward the upwardly inclined position thereof with respect to the receptacle 29, the springs 39 are unwound. When the lid portion 32a of the armrest member 32 is held in or turned into the upwardly inclined position thereof, the springs 39 are neutralized and are thus made inoperative to urge the lid portion 32a toward the horizontal position thereof. The snap-action spring means of the above described nature is provided by preference and may thus be dispensed with if desired.

When the lid portion 32a of the armrest member 32 is held in the horizontal position thereof, the lid portion 32a serves as a lid closing the receptacle 29 at the upper end thereof and further as an armrest for a vehicle occupant seated aside the rack-and-armrest assembly. The receptacle 29 thus closed by the lid portion 32a of the armrest member 32 may be utilized to have stored therein any article such as a road map (not shown). When the lid portion 32a is held in the horizontal position thereof, furthermore, the rack-and-armrest assembly embodying the present invention can be utilized also as a handle or knob for closing the door structure of the vehicle from its open position. For this purpose, the vehicle occupant seated aside the rack-and-armrest assembly may have his fingers slipped into the concavity 31 in the grip portion 29f of the receptacle 29 through the gap 35 between the lining 28 and the lid portion 32a of the armrest member 32 and may pull the door structure toward himself by gripping the grip portion 29f of the receptacle 29 with the fingers.

When it is desired to open the receptacle 29 for putting an article such as a road map thereinto or taking out such an article therefrom, the vehicle occupant may have his fingers slipped into the gap 36 between the inner wall portion 29a of the receptacle 29 and the lid portion 32a of the armrest member 32 and may raise the lid portion 32a upwardly from the receptacle 29. The lid portion 32a of the armrest member 32 is then turned about the grooves 32d in the armrest member 32 against the opposing forces of the torsion springs 39 until the lid portion 32a reaches the upwardly inclined position thereof. The lid portion 32a can be turned back from the upwardly inclined position to the horizontal position thereof simply by manually pressing the lid portion 32a away from the lining 28. When the lid portion 32a is thus pivotally moved slightly from the upwardly inclined position toward the horizontal position thereof, the lid portion 32a is forcibly turned into the horizontal position thereof by the forces of the springs 39.

As will have been appreciated from the foregoing description, the combination rack-and-armrest assembly embodying the present invention is characterized in that the receptacle 29 of the assembly is secured to the inner panel 27 of the door structure and can be closed and opened simply by turning the lid portion 32a of the armrest member 32 between the horizontal and upwardly inclined position thereof with respect to the receptacle 29. The receptacle 29 can thus be closed and opened without being moved toward the vehicle occupant seated aside the rack-and-armrest assembly so that the vehicle occupant need not twist his waist or move himself on the seat each time occupant wishes to put an article into or take out the article from the receptacle 29.

The combination rack-and-armrest assembly embodying the present invention is further characterized in that the handle for closing the door structure toward the inside of the vehicle compartment is constituted by the grip portion 29f of the receptacle 29 secured to the inner panel 27 of the door structure. The mechanical connection between the door structure and the door handle constituted by the grip portion 29f is for this reason maintained firm and robust and will endure repeated application of loads to the grip portion 29f used as the door handle.

What is claimed is:

1. A combination rack-and-armrest assembly for attachment to an inner panel of a door structure of an automotive vehicle body, comprising:

a hollow receptacle secured to the inner panel of the door structure and having an open upper end, the hollow receptacle having an inner wall portion spaced apart inwardly from said inner panel, a pair of side wall portions merging out of the inner wall portion and terminating on the inner panel of the door structure, and a grip portion formed with an upwardly open concavity adjacent the inner panel, said concavity having a width which will allow passage of fingers of an ordinary person thereinto, said inner wall portion, said side wall portions, said grip portion, and a portion of said inner panel defining a receptacle chamber which extends below said grip portion and having below said grip portion a horizontal cross section contiguous to the inner panel of the door structure substantially throughout the extent of the receptacle chamber, and an armrest member at least in part pivotally movable with respect to said receptacle about a substantially horizontal axis located in close proximity to said inner panel between a first angular position closing the upper end of the chamber in the receptacle and a second angular position inclined upwardly from the first angular position toward the inner panel of the door structure and allowing the chamber in the receptacle to be open upwardly through the upper end thereof, said armrest member being formed with a recess forming a gap above said concavity in the grip portion of the receptacle.

2. A combination rack-and-armrest assembly as set forth in claim 1, in which said armrest member has a lid portion pivotally movable about said axis between said first angular position and said second angular position and a retaining portion secured to the inner panel of the door structure and formed with two grooves which are aligned with each other across said recess and which extend along said axis, said lid portion being pivotally movable with respect to said retaining portion about and across said grooves.

3. A combination rack-and-armrest assembly as set forth in claim 2, in which said armrest member is constructed of a synthetic resin.

4. A combination rack-and-armrest assembly as set forth in any one of claims 1 to 3, in which said inner wall portion of the receptacle is formed with a recess substantially horizontally elongated along the upper end of the inner wall portion and forming a gap between the inner wall portion and the armrest member when the armrest member is held in said first angular position, said recess being sized to permit an ordinary person to have his or her fingers slipped into said gap.

5. A combination rack-and-armrest assembly as set forth in any one of claims 1 to 3, further comprising spring means urging the armrest member to said first angular position thereof.

6. A combination rack-and-armrest assembly as set forth in claim 2 or 3, further comprising spring means which comprises an anchor element secured to said lid portion, an anchor member secured to the inner panel of the door structure and a coiled torsion spring pivotally connected at one end thereof to said anchor element and at the other end thereof to said anchor member, said anchor element, said anchor member and said spring being arranged so that the spring is effective to urge the lid portion to turn toward said first angular position thereof except when the lid portion is held in said second angular position.

* * * * *